United States Patent
Aoyama et al.

(10) Patent No.: US 6,771,599 B1
(45) Date of Patent: Aug. 3, 2004

(54) METHOD AND UNIT FOR CONTROL OF COMMUNICATION

(75) Inventors: Yasuhiro Aoyama, Komae (JP); Yuji Hashimoto, Fujisawa (JP)

(73) Assignee: Matsushita Electric Industrial Co., Ltd. (JP)

( * ) Notice: Subject to any disclaimer, the term of this patent is extended or adjusted under 35 U.S.C. 154(b) by 820 days.

(21) Appl. No.: 09/694,794

(22) Filed: Oct. 24, 2000

(30) Foreign Application Priority Data

Oct. 25, 1999 (JP) ............................................ 11-302371

(51) Int. Cl.$^7$ ........................ G01R 31/08; G06F 11/00; G08C 15/00; H04J 1/16; H04J 3/14
(52) U.S. Cl. ...................................... 370/230; 370/235
(58) Field of Search ................................. 370/229, 230, 370/236.1, 395.71, 231, 232, 233, 234, 235, 468, 395.41

(56) References Cited

U.S. PATENT DOCUMENTS

| | | | | |
|---|---|---|---|---|
| 5,467,348 A | | 11/1995 | Fujii et al. | 370/468 |
| 5,777,984 A | * | 7/1998 | Gun et al. | 370/230 |
| 5,793,747 A | * | 8/1998 | Kline | 370/230 |
| 5,812,527 A | * | 9/1998 | Kline et al. | 370/232 |
| 5,974,466 A | * | 10/1999 | Mizutani et al. | 709/236 |
| 6,081,507 A | * | 6/2000 | Chao et al. | 370/235 |
| 6,377,550 B1 | * | 4/2002 | Prasad | 370/236.1 |
| 6,633,543 B1 | * | 10/2003 | Storr | 370/236.1 |

FOREIGN PATENT DOCUMENTS

JP      11239151      8/1999

* cited by examiner

Primary Examiner—Wellington Chin
Assistant Examiner—Jamal A. Fox
(74) Attorney, Agent, or Firm—Connolly Bove Lodge & Hutz LLP (57) ABSTRACT

A communication control method accomplishes minimum bandwidth guarantee and maximum bandwidth restriction and further allocates an extra-bandwidth in accordance with user's contact bandwidth. Fixed-length packets are once stored in corresponding partitions of a buffer in accordance with connection information contained in the packets and then transmits the packets from the storage sections in succession. Retrieval of a connection where the number of transmitted packets does not reach a lower-limit throughput and a packet to be transmitted exists in the corresponding partition is made with first priority, and retrieval is further made in order for a connection where the number of transmitted packets does not reach an intermediate throughput and a connection where the number of transmitted packets does not reach an upper-limit throughput. If the retrieval shows a hit connection, the packets are transmitted from the corresponding partition and one-time retrieval comes to an end.

8 Claims, 7 Drawing Sheets

METHOD AND UNIT FOR CONTROL OF COMMUNICATION

BACKGROUND OF THE INVENTION

1) Field of the Invention

The present invention relates to a communication control method and unit for use in communication systems such as an ATM network.

2) Description of the Related Art

In the recent years, in an ATM (Asynchronous Transfer Mode) network in which a packet of a fixed length (53 bytes), called "cell", is transmitted through a plurality of connections (virtual channels), there has arisen a requirement for the realization of a service which guarantees the minimum bandwidth (MCR; Minimum Cell Rate) and limits the maximum bandwidth (PCR; Peak Cell Rate) at every connection.

For this requirement to reach satisfaction, there has been proposed a communication control device disclosed in Japanese Unexamined Patent Publication No. (HEI) 11-239151. A detailed description will be given hereinbelow of this device for a comparison with the present invention and for a abetter understanding of the invention (where a portion of the terms differ therefrom).

This device includes a buffer and a connection retrieval table. The buffer is for storing an inputted cell in the corresponding partition (storage section) in accordance with the connection identification information contained in the same cell.

The connection retrieval table is constructed with an associative memory (content addressable memory, which will be called "CAM" for short). In this connection retrieval table, not only a lower-limit throughput MCR corresponding to the minimum bandwidth to be ensured is stored according to connection, but also a result (PCR–MCR) of a subtraction of the aforesaid MCR from an upper-limit throughput PCR corresponding to the maximum bandwidth is stored for limiting the maximum bandwidth, and even a buffer flag is stored which is representative of whether or not a cell(s) exists in the buffer, according to partition, i.e., connection.

This connection retrieval table additionally contains the numbers of first and second remaining cells. The number of first remaining cells decreases by one whenever cell transmission takes place in a state where the foregoing lower-limit throughput MCR constitutes its initial value, while the number of second remaining cells decreases by one at every cell transmission after the number of first remaining cells reaches zero in a state where the aforesaid (PCR–MCR) forms its initial value. The number of first remaining cells is representative of how many cells remain to be transmitted for ensuring the minimum bandwidth, while the number of second remaining cells is indicative of how many transmittable cells remain for limiting the maximum bandwidth.

The retrieval of the above-mentioned connection retrieval table is made through the use of a CAM: retrieval facility according to the round robin control method. First, a retrieval is made on the basis of the content of the number of first remaining cells >1 and the buffer flag =1, and a cell is transmitted from the partition corresponding to the hit connection. On the other hand, if a round of all the connections is made while still hitting no connection on the basis of the aforesaid contents, then a retrieval is further done by the content of the number of second remaining cells >1 and the buffer flag =1, and a cell is sent out from the partition corresponding to the hit connection. Nevertheless, if this content also does not produce the hit on a connection, an idle cell is sent out in this case.

With the above-mentioned retrieval, until the lower-limit throughput is reached with respect to all the connections, if the cell to be transmitted exists, the transmission of cells exceeding the lower-limit throughout is inhibited, thereby ensuring the minimum bandwidth on all the connections. In addition, in the case of the connections in which the number of transmitted cells reaches the upper-limit throughput, the cell transmission from a buffer is inhibited, which can limit the maximum bandwidth.

Incidentally, the above-described Publication additionally discloses a unit in which a flag is stored in place of the number of second remaining cells to make a retrieval efficiently.

However, although the unit disclosed in the Publication can achieve the minimum bandwidth guarantee and the maximum bandwidth restriction according to connection (user), difficulty is encountered in allocating the extra-bandwidth, exceeding the lower-limit throughput for each connection, in accordance with the volume of user's contract band. That is, the extra-bandwidth before the maximum bandwidth restriction is equally used for all the connections, which signifies that difficulty is experienced in allocating the extra-bandwidth in accordance with the user's contract band volume.

SUMMARY OF THE INVENTION

In accordance with a first aspect of the present invention, there is provided a communication control method of once storing fixed-length packets in corresponding storage sections in accordance with connection information contained in the packets and of then transmitting the packets from the storage sections in succession, the method comprising the steps of setting a lower-limit throughput corresponding to a minimum bandwidth to be ensured, an upper-limit throughput corresponding to a maximum bandwidth to be limited, and at least one intermediate throughput between the lower-limit throughput and the upper-limit throughput; counting the number of packets transmitted for each of connections, and monitoring whether or not a packet to be transmit ted exists in the storage section, for each of the connections; retrieving a connection, satisfying a first condition that the number of transmitted packets does not reach the lower-limit throughput and the packet to be transmitted exists in the corresponding storage section, with first priority, and further, if no hit connection exists under the first condition; retrieving a connection satisfying a second connection that the number of transmitted packets does not reach the intermediate throughput and the packet to be transmitted exists in the corresponding storage section, and still further, if no hit connection exists under the second condition, retrieving a connection satisfying a third connection that the number of transmitted packets does not reach the upper-limit throughput and the packet to be transmitted exists in the corresponding storage section; if a hit connection is present under any one of the first to third conditions, transmitting the packet from the storage section corresponding to the hit connection and terminating one-time retrieval, while if no hit connection exists under each of the first to third conditions, terminating one-time retrieval without conducting the packet transmission from the storage section and then resuming the retrieval at the connection satisfying that the number of transmitted packets does not reach the lower-limit throughput; and during the repetition of the retrieval, stopping the packet transmission for a connection where the number of transmitted packets reaches the upper-limit throughput.

In this case, the connection retrieval is made in a predetermined sequence, and the following retrieval resumes at a connection subsequent to the hit connection. Furthermore, a control cycle of a predetermined time period is set so that the retrieval is made more-than-one times in the control cycle, and the number of packets transmitted is counted according to connection in the control cycle, and whenever the control cycle starts newly, the count value of packets transmitted is cleared, before the counting resumes.

It is also appropriate that a plurality of intermediate throughputs are set as the intermediate throughput between the lower-limit throughput and the upper-limit throughput, and in the retrieval, a connection satisfying the first condition that the number of transmitted packets does not reach the lower-limit throughput and the packet to be transmitted exists in the corresponding storage section is retrieved with first priority, and if no hit connection exists under the first condition, the connection retrieval is made stepwise in the order of increasing intermediate throughput, and if no hit connection exists even in the retrieval made on the basis of the largest intermediate throughput, the connection retrieval is finally made for a connection satisfying the third connection that the number of transmitted packets does not reach the upper-limit throughput and the packet to be transmitted exists in the corresponding storage section.

In addition, it is also appropriate that the intermediate throughput is set to partition equally the range between the lower-limit throughput and the upper-limit throughput, that, for a portion of the connections, the lower-limit throughput is set at zero, or that, for a portion of the connections, the lower-limit throughput, the intermediate throughput and the upper-limit throughput are set to be equal to each other.

Moreover, in accordance with another aspect of the present invention, there is provided a communication control unit comprising: a plurality of storage sections each for storing fixed-length packets for each of connections; a storage control section for recognizing connection identification information contained in a packet inputted to store the packet in the storage section corresponding to the connection recognized; a transmitted packet counting section for counting the number of transmitted packets for the corresponding connection whenever packet transmission takes place; a control parameter memory for storing the number of transmitted packets counted in a control cycle of a predetermined time period, and further for storing the number of packets accumulated in the storage section according to connection; an accumulated packet addition section for adding one to the number of accumulated packets in the control parameter memory to update the number of accumulated packets whenever a packet is stored in the storage section; an accumulated packet subtraction section for subtracting one from the number of accumulated packets in the control parameter memory to update the number of accumulated packets whenever a packet is transmitted from the storage section; a set parameter memory for storing a lower-limit throughput corresponding to a minimum bandwidth to be ensured, an upper-limit throughput corresponding to a maximum bandwidth to be limited, and at least one intermediate throughput between the lower-limit throughput and the upper-limit throughput, according to connection; a class designation section for classifying all of the connections on the basis of throughput information stored in the set parameter memory according to connection and the number of transmitted packets stored in the control parameter memory according to connection so that a class in which the number of transmitted packets does not reach the lower-limit throughput is designated as a highest transmission priority class, and of a plurality of classes obtained by partitioning a range between the lower-limit throughput and the upper-limit throughput by the intermediate throughput, a class in which the number of transmitted packets is lower is designated as a higher transmission priority class, with the class designation section designating, as a transmission inhibition class, a connection in which the number of transmitted packets reaches the upper-limit throughput; an accumulation status recognition section for recognizing a packet accumulation status signifying whether or not a packet is accumulated in the storage section, on the basis of the number of accumulated packets stored in the control parameter memory; a retrieval table for storing the designated classes and a flag indicative of the recognized packet accumulation status for each of the connections; retrieving means for conducting retrieval with respect to the retrieval table more-than-one times in the control cycle, with the retrieving means conducting the first retrieval in the order of descending transmission priority class and conducting connection retrieval on each of the classes in a predetermined sequence to seek a hit connection which pertains to a class under retrieval and for which the packet accumulation flag shows packet accumulation, and if no hit takes place on all the connections, conducting connection retrieval with respect to a lower transmission priority class in like manner, and, if no hit takes places with respect to the lowest transmission priority class, outputting a retrieval result showing the absence of a hit connection while, if a hit on a connection takes place in any one of the classes, resuming the following retrieval at a connection subsequent to the hit connection; and a transmission control section for, when the retrieving means seeks a hit connection, transmitting the packets from the storage section corresponding to the hit connection, and for, when the retrieving means outputs the hit connection absence retrieval result, stopping packet transmission from the storage section.

According to a feature of the present invention, an intermediate throughput is set to manage each of connections according to precedence so that an extra-bandwidth is allocated according to contact bandwidth volume, which can use the extra-bandwidth efficiently.

According to another feature of the inventions since the retrieval resumes at a connection subsequent to a hit connection, it is possible to evenhandedly implement the bandwidth control on the basis of set throughputs.

According to a further feature of the invention, a control cycle of a predetermined time period is set for conducting retrieval more-than-one times so that the number of packets transmitted according to connection is counted in the control cycle and the counting thereof starts in a state where the count value is cleared whenever the control cycle starts newly. Accordingly, it is possible to precisely understand the number of transmitted packets in one-time control cycle (predetermined time period), which enables accurate bandwidth control through the comparison between the number of transmitted packets and the upper-limit, lower-limit and intermediate throughputs.

According to a further feature of the invention, a plurality of intermediate throughputs are set, thus achieving fine control based upon precedence.

According to a further feature of the invention, the intermediate throughput is set at an appropriate value.

According to a further feature of the invention, various access modes are acceptable by adjusting the upper-limit, lower-limit and intermediate throughputs.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS

A first embodiment of the present invention will be described hereinbelow with reference to the drawings. The first embodiment relates to the application of the invention to a station side terminal unit (communication control unit) closest to a user, in an ATM network (communication system) constructed with an optical fiber network. This unit is referred to as an "OLT (Optical Line Terminal), and is for implementing communication control in a downstream direction (that is, in a direction from the ATM network to the user) and in an upstream direction (that is, in a direction from the user to the ATM network). A detailed description will be given hereinbelow of a configuration and operation for the downstream communication control, particularly, for band control.

Figure 1:
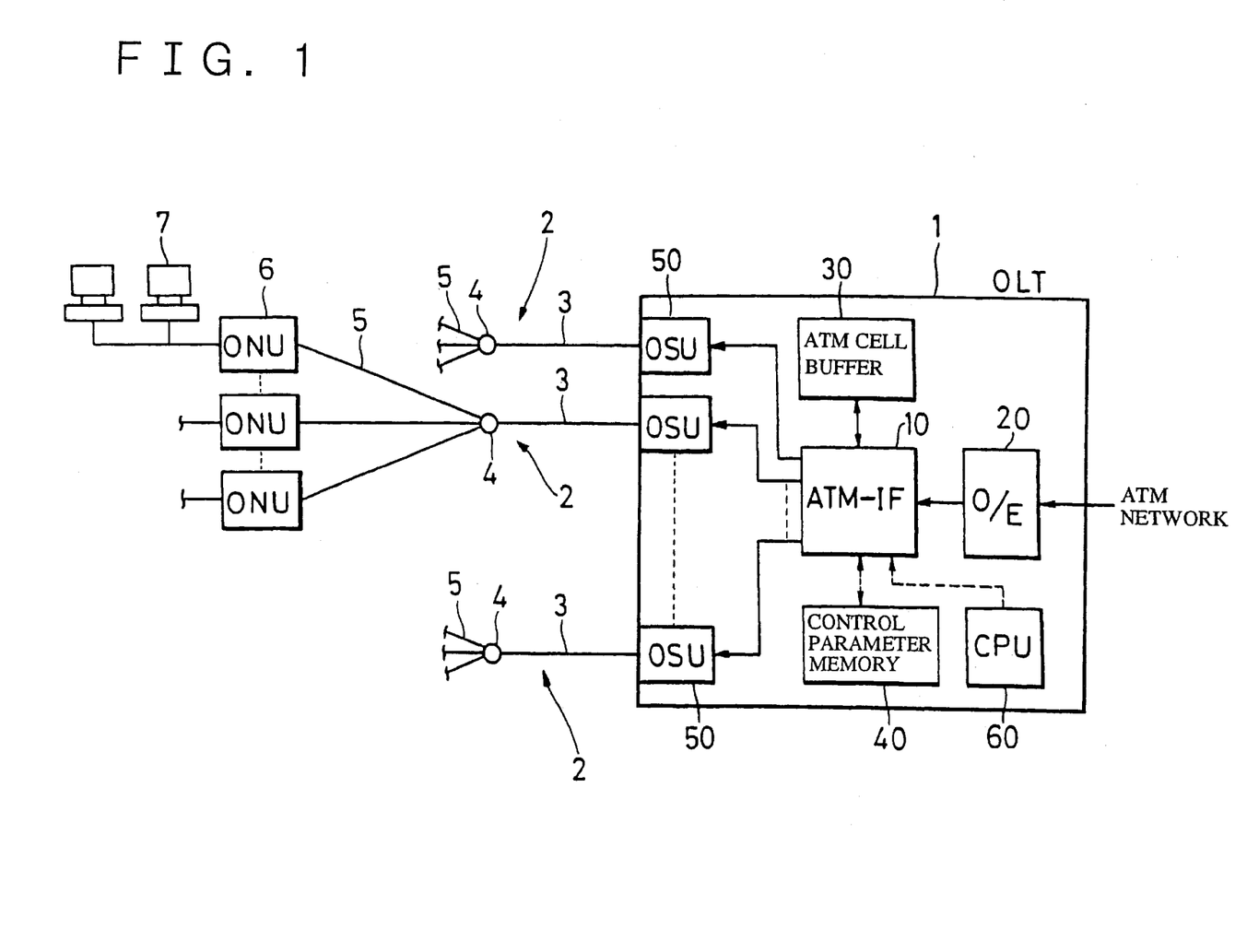
FIG. 1 schematically shows a communication control unit according to a first embodiment of the present invention and an access network from this unit to a user.

As FIG. 1 shows, the station side terminal unit, designated generally at reference numeral 1, is made up of an ATM interface (ATM-IF) 10 constituting a main part, a photoelectric conversion circuit 20 for converting an ATM cell (which will hereinafter be referred to simply as a "cell") comprising an optical signal from the ATM network into an electric signal to send it to the ATM interface 10, an ATM cell buffer 30 for storing/sending the cell in accordance with a command from the ATM interface 10, a control parameter memory 40 for storing a parameter needed for band control according to connection, a plurality of (in this embodiment, eight) OSU (Optical Service Unit) 50 each for converting a cell from the ATM interface 10 into an optical signal to send it to a user side access network 2, and a CPU 60 for writing a set parameter in an internal memory (a reference table 14 which will be described later) of the ATM interface 10 in accordance with a command from a station.

Each of the access networks 2 is configured, for example, in the PDS (Passive Double Star) mode, and is equipped with a common optical fiber 3 connected to the corresponding OSU 50, a plurality of (in this embodiment, 32) branch optical fibers 5 coupled through a star coupler 4 to the common optical fiber 3, and ONUs (Optical Network Units) 6 each connected to the terminal of the corresponding branch optical fiber 5. The cell forming an optical signal is converted into a electric signal in the ONU 6 and forwarded to a personal computer 7 or the like.

Incidentally, the aforesaid OSU 50 and ONU 6 have a multiplexing/demultiplexing function in addition to the above-mentioned photoelectric conversion function.

The aforesaid cell is a packet having a fixed length (53 bytes), and the leading five bytes contain connection identification information (connection number information) comprising a virtual path identifier VPI and a virtual channel identifier VCI. In this embodiment, a virtual channel VC has a one-to-one correspondence with the aforesaid branch optical fiber 5 (ONU 6).

Among the control parameters to be stored in the memory 40, there are the number CA of cells accumulated in the buffer 30, the number CCR of cells transmitted, and others.

The aforesaid buffer 30 is an FIFO buffer, and in each partition (storage section), the cells are sent out in the order of storage.

The unit 1 is for implementing cell band control with respect to connections corresponding in number to the branch optical fibers 5 (or the ONUs 6). In a case in which, as stated above, 8 OSUs 50 are provided and 32 branch optical fibers 5 are connected to each of the OSUs 50, the connections are 256 in number, and the buffer 30 needs the same number of partitions.

Figure 5:
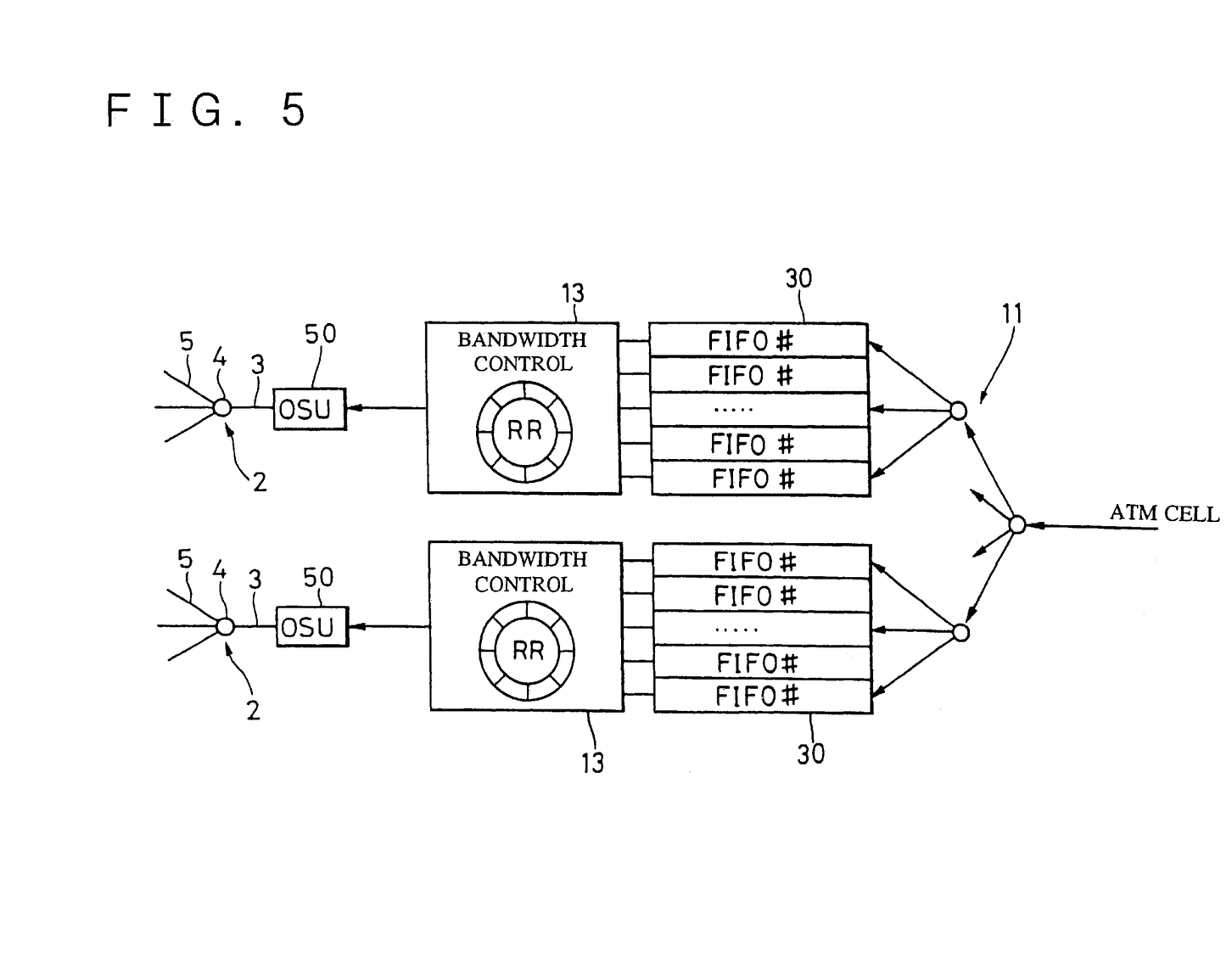
FIG. 5 is an illustration useful for explaining the outline of a flow from cell storage to cell transmission.

For an easy understanding of the configuration of the ATM interface 10 which will be described later, referring to FIG. 5, a description will be given here of the outline of a flow of cells. In this embodiment, since the OSUs 50 is eight in number, the aforesaid cell connections are classified into eight groups, and accordingly, the aforesaid buffer partitions are divided into eight groups each comprising 32 partitions. A storage control section 11, which will be mentioned later, selects a group or a partition of a group in conjunction with the cell connection for the storage of cells. In addition, the bandwidth control in a round robin retrieval section 13, which will be described later, is implemented according to group to transmit cells to the corresponding OSU 50. In the following description of the ATM interface 10, attention will be focused on cell bandwidth control pertaining to one group.

Figure 2:
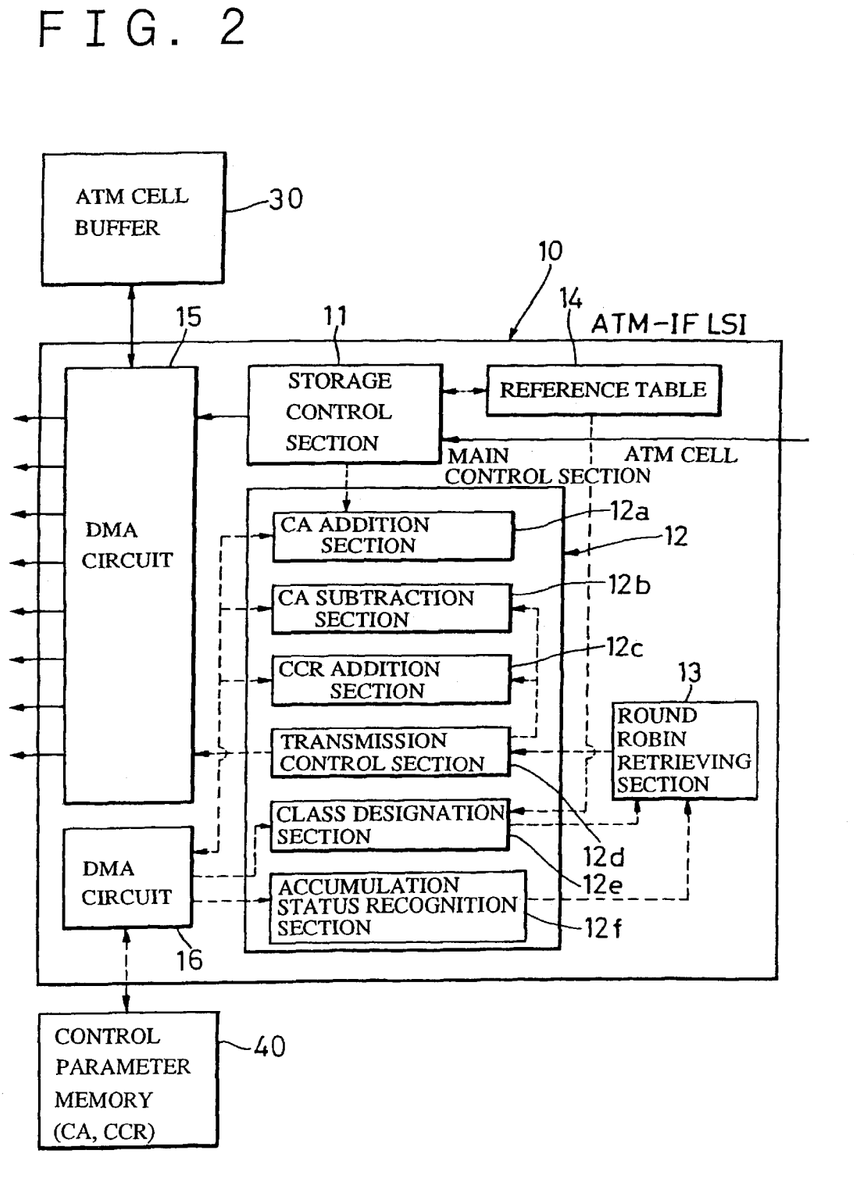
FIG. 2 is a block diagram showing a circuit arrangement in the essence of the communication control unit.

The ATM interface 10 comprises one LSI and has a circuit arrangement shown in FIG. 2. In detail, this ATM interface 10 includes a storage control section 11, a main control section 12, a round robin retrieval section 13, a reference table 14, and DMA circuits (Dynamic Memory Access circuits) 15 and 16.

The reference table 14 is made up of an associative memory (CAM), and at each address, there are written a partition number of the buffer 30, the aforesaid connection identification information, and throughput information set by the CPU 60, in this instance, a lower-limit throughput MCR corresponding to the minimum bandwidth to be ensured, an upper-limit throughput PCR corresponding to the maximum bandwidth to be limited, and an intermediate throughput SCR. Thus, this reference table 14 also functions as a set parameter memory.

In this embodiment, the intermediate throughput to be set is one in number, and assumes a right median value between the upper-limit throughput PCR and the lower-limit throughput MCR. That is, this satisfies the following equation.

$$SCR=(PCR+MCR)/2$$

These throughputs MCR, SCR and PCR are expressed by the number of cells transmitted in a control cycle for a predetermined period of time.

The aforesaid storage control section 11 receives a cell from the photoelectric conversion circuit 20 and recognizes the identification information VPI and VCI in this cell to conduct the retrieval with respect to the reference table 14 on the basis of this identification information for storing, on the basis of the retrieved partition number, the cell in the corresponding partition of the buffer 30 through the use of the DMA circuit 15.

As FIG. 2 shows, the main control section 12 of the ATM interface 10 comprises a CA addition section (accumulated cell addition section, accumulated packet addition section) 12a, a CA subtraction section (accumulated cell subtraction section, accumulated packet subtraction section) 12b, a CCR addition section (transmitted cell addition section, transmitted packet counting section) 12c, a transmission control section 12d, a class designation section 12e, and an accumulation status recognition section 12f.

The transmission control section 12d of the main control section 12 receives the retrieval result from the round robin retrieval section 13, which will be described hereinafter, to derive a cell from the partition corresponding to the hit connection, then transmitting the cell through the DMA circuit 15 to the OSU 50.

The CA addition section 12a of the main control section 12 reads out, through the DMA circuit 16, the number CA of accumulated cells for the corresponding connection from the aforesaid memory 40 in response to an operation of cell storage into the buffer 30, conducted by the storage control section 11, to add (increment) one thereto for updating, and writes the updated number CA of accumulated cells in the memory 40 through the use of the DMA 16.

The CA subtraction section 12b reads out the number CA of accumulated cells for the corresponding connection from the memory 40 whenever the transmission control section 12d carries out the cell transmission from the buffer 30 to subtract (decrement) one therefrom for updating, and puts the updated number CA of accumulated cells in the memory 40.

The accumulation status recognition section 12f recognizes whether the number CA of accumulated cells for each connection is zero or one or more, and write this recognition result as an accumulation status flag in a retrieval table 13a of the round robin retrieval section 13 described later.

Secondly, a detailed description will be given hereinbelow of an arrangement for calculation of the number CCR of transmitted cells. The CCR addition section 12c reads out the number CCR of transmitted cells for the corresponding connection from the memory 40 whenever cell transmission takes place from the buffer 30 to add one thereto: for updating, and puts the updated number CCR of transmitted cells in the memory 40.

The class designation section 12e compares the number CCR of transmitted cells with the throughputs PCR, MCR and SCR stored in the reference table 14 to designate a class at every connection.

The class designation is carried out as follows. That is:
when CCR<MCR, PRIORITY-1 (class having the highest precedence in transmission);
when MCR≦CCR<SCR, PRIORITY-2 (class having the second-highest precedence in transmission);
when SCR≦CCR<PCR, PRIORITY-3 (class halving the lowest precedence in transmission); and
when CCR=PCR, PRIORITY-0 (transmission inhibition class).

Figure 3:
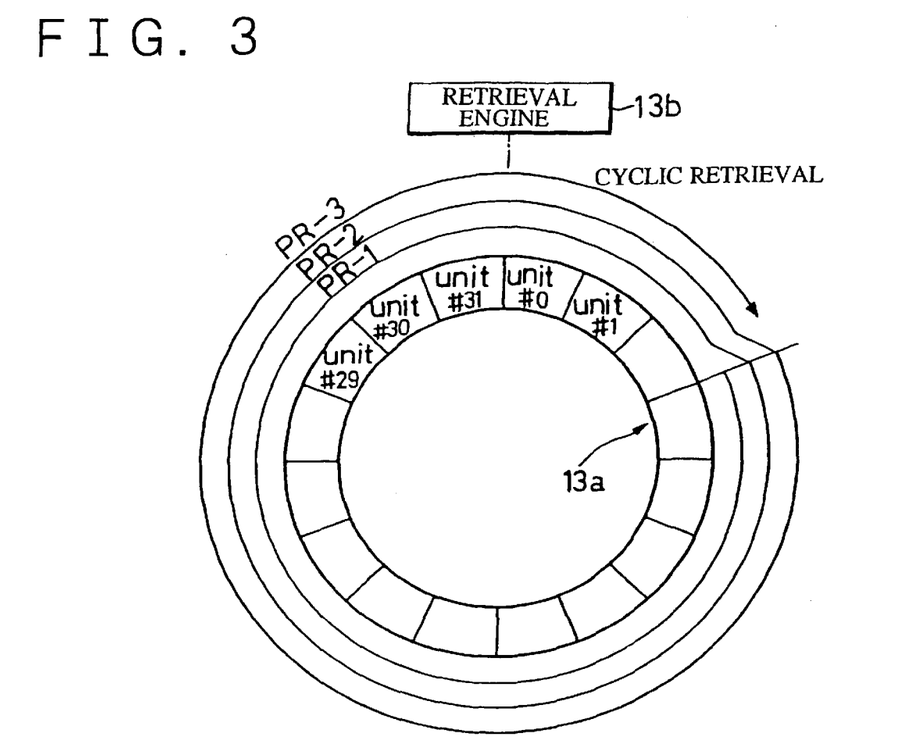
FIG. 3 is a conceptual illustration of a round robin retrieval manner.

In addition, the information on the PRIORITY-1, PRIORITY-2, PRIORITY-3 or PRIORITY-0 (which will hereinafter be refereed to simply as "PR-1, PR-2, PR-3 or PR-0") is written in the retrieval table 13a of the round robin retrieval section 13 described hereunder.

Furthermore, referring to FIG. 3, a description will be given hereinbelow of the round robin retrieval section 13. Although FIG. 3 shows only the retrieval section 13 corresponding to one OSU 50, in fact, eight retrieval sections 13 each identical thereto are provided in corresponding relation to the OSUs 50. The retrieval section 13 includes a retrieval table 13a and a retrieval engine (retrieving means) 13b. Incidentally, FIG. 3 illustrates a circular configuration for an easy understanding of the operation of the round robin retrieval section 13.

The retrieval table 13a has 32 addresses corresponding to 32 connections. At each address, there exist information of five bits in total: two-bit (PB1, PB2) designation class data, a one-bit accumulation status flag (PB0), a pointer flag (PF) and a reset flag (RF). The two bits (PB1, PB2) indicate the above-mentioned four designation classes as follows. That is:
for designation class PR-1, (PB2, PB1)=(0, 0);
for designation class PR-2, (PB2, PB1)=(0, 1);
for designation class PR-3, (PB2, PB1)=(1, 0); and
for designation class PR-0, (PB2, PB1)=(1, 1).

When the aforesaid accumulation status flag (PB0) shows "1", this signifies that a cell is accumulated in the corresponding partition. On the other hand, when the accumulation status flag PB0 shows "0", this indicates that no cell is not accumulated in the corresponding partition. The pointer flag PF shows "1" with respect to an address hit in a cyclic retrieval, with this address constituting the origin for the next cyclic retrieval. The reset flag RF is for initializing (clearing) the number of transmitted cells at every control cycle, with "1" indicating an initialization requiring condition while "0" signifying an initialized condition. Thus reset flag RF is simultaneously set at "1" at all the addresses whenever one (one-time) control cycle reaches completion.

As FIG. 3 shows, the retrieval engine 13b conducts the cyclic retrieval over the aforesaid retrieval table 13a in the round robin mode. In detail, the retrieval is first made with respect to the transmission priority class PR-1 in a sequence of address. Following this, if there is an address at which a cell(s) is accumulated, in the transmission priority class PR-1, that is, if a hit is made at an address showing (PB2, PB1, PB0)=(0, 0, 1), then the cell is sent out from the partition corresponding to this address.

If no hit takes place in the transmission priority class PR-1, that is, if all the addresses do not show (PB2, PB1, PB0)=(0, 0, 1), the retrieval is then made in the designation class PR-2 in the order of address. In the case of this transmission priority class PR-2, if there is an address showing cell accumulation, that is, a hit takes place at an address of (PB2, PB1, PB0)=(0, 1, 1), the cell is sent out from the partition corresponding to this address.

On the other hand, if no hit takes place in the transmission priority class PR-2, that is, if all the addresses do not show (PB2, PB1, PB0)=(0, 1, 1), the retrieval is then made in the transmission priority class PR-3 in the order of address. In the transmission priority class PR-3, a hit is made at an address showing cell accumulation, that is, a hit takes place at an address of (PB2, PB1, PB0)=(1, 0, 1), the cell is sent out from the partition corresponding to this address.

Meanwhile, if no hit takes place in the transmission priority class PR-3, that is, if there exists only an address at which the number of transmitted cells reaches the upper-limit throughput PCR to establish the transmission inhibition class PR-0, i.e., (PB2, PB1)=(1, 1) or at which the number of accumulated cells is zero to establish PB0=0, a retrieval result showing the absence of a hit address is outputted to the transmission control section 12d. In this case, the transmission control section 12d transmits an idle cell without conducting the cell transmission from the buffer 30.

The cyclic retrieval and the cell transmission are conducted repeatedly in a cycle of a predetermined period (shorter considerably than the above-mentioned control cycle). The cyclic retrieval starts at the transmission priority class PR-1 at all times. Accordingly, even in the case of an address which has pertained to the transmission priority class PR-1 in the previous retrieval at which no hit has taken place because of the absence of an accumulated cell, upon input of a cell, a hit on that address takes place this time. Also in the case of the transmission priority classes PR-2 and PR-3, the address hit likewise takes place.

The pointer flag PF stored in the retrieval table 13a indicates "1" at the address hit in the retrieval by the retrieval engine 13b, and the next cyclic retrieval resumes at the address subsequent to the address at which the pointer flag PF indicates "1". In this way, an evenhanded round robin retrieval is securable.

A description will be given here of the meaning, i.e., effects, of the above-mentioned round robin retrieval.

(1) About Retrieval on Transmission Priority class PR-1

A hit on (retrieving) a connection where the number of transmitted cells does not reach the lower-limit throughput MCR takes place to send out the cells successively from the corresponding partition. In the meantime, the cell transmission for the connection where the number of transmitted cells has reached the lower-limit throughput MCR comes to a stop. In consequence, the highest priority is given to that the number of transmitted cells reaches the lower-limit throughput MCR in all the connections, which certainly achieves the minimum bandwidth guarantee.

(2) About Retrieval on Transmission Priority class PR-2

A hit on a connection where the number of transmitted cells does not reach the intermediate throughput SCR takes place to send out the cells successively from the corresponding partition. In the meantime, the cell transmission for the connection where the number of transmitted cells has reached the intermediate throughput SCR comes to a stop. In consequence, the transmission of more cells for a connection with a high precedence (high intermediate throughput SCR) is achievable. This means that the extra-bandwidth before the maximum bandwidth restriction is allocatable according to the precedence of the connection.

(3) About Retrieval on Transmission Priority class PR-3 A hit on a connection where the number of transmitted cells does not reach the upper-limit throughput PCR takes place to send out the cells successively from the corresponding partition. In the meantime, the cell transmission for the connection where the number of transmitted cells has reached the upper-limit throughput PCR comes to a stop. In consequence, the maximum bandwidth is limitable so that congestion after the OSU 50 is surely avoidable.

Figure 4:
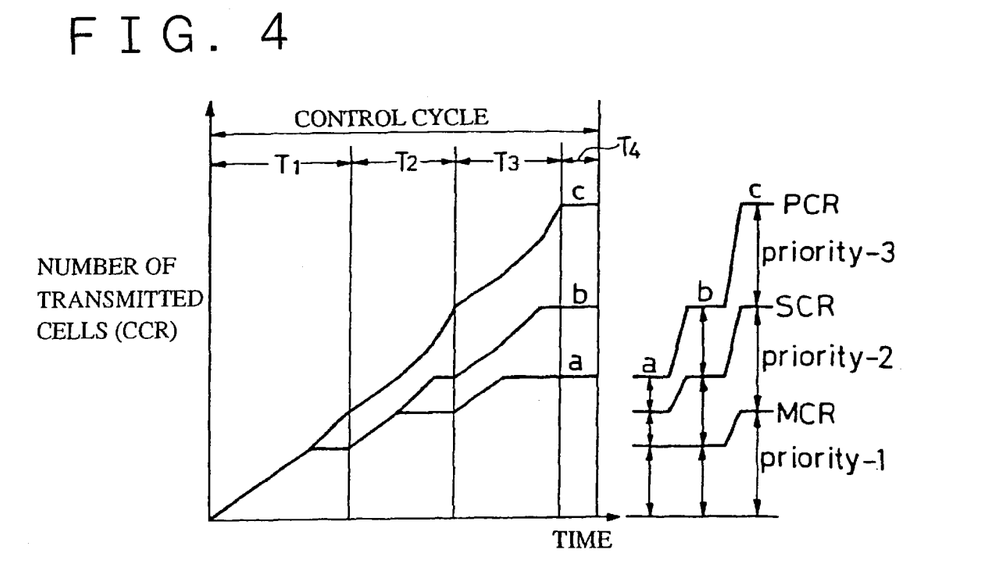
FIG. 4 is an illustration useful for explaining the effects of the bandwidth control according to the invention on the assumption that connections are three in number.

Referring to FIG. 4, a description will be given hereinbelow for an easy understanding of the effects of the foregoing retrieval. The following description will be made on three connections a, b and c for simplification. In this case, the connections a, b and c are arranged in the order of descending transmission precedence. That is, each of the throughputs MCR, SCR and PCR assumes a higher value in the order of the connections a, b and c as illustrated in FIG. 4. However, the lower-limit throughputs MCR of the connections a I and b are equal to each other.

FIG. 4 is an illustration of a state in which the number of transmitted cells increases with the passage of time according to connection in one-time control cycle. In this case, cells are assumed to exist in each partition at all times. In the control cycle, the first time period T1 is a time taken until all the connections reach the lower-limit throughput MCR (until the number CCR of transmitted cells reaches the lower-limit throughput MCR with respect to all the connections), the second time period T2 is a time taken until all the connections reach the intermediate throughput SCR, the third time period T3 is a time taken until all the connections reach the upper-limit throughput PCR, and the fourth (last) time period T4 is a time for which the cell transmission for each connection is in a stopping condition after all the connections reach the upper-limit throughput PCR. As obvious from the bandwidth control in the time periods T2 and T3, the extra-bandwidth is allocatable according to the precedence.

The bandwidth control in the first time period T1 of the control cycle depends upon the lower-limit throughput MCR set for the minimum bandwidth guarantee. Furthermore, the bandwidth control in the last time period T4 of the control cycle depends upon the upper-limit throughput PCR set for the maximum bandwidth restriction. These are similar to those in the above-described conventional technique.

The effects peculiar to the present invention reside in the bandwidth control (extra-bandwidth control) in the intermediate time periods T2 and T3 of the control cycle. That is, the setting of the intermediate throughput SCR can cause the precedence of the connection to clearly affect the extra-bandwidth control.

In the above-described model, although all the connections are assumed to reach the maximum bandwidth in the control cycle, actually, in most case, only a portion of connections reaches the maximum bandwidth, or all the connections do not reach the maximum bandwidth. In other words, in many cases, the aforesaid time period T4 is short or has no place in the control cycle. For this reason, the proportion of the time periods T2 and T3 tends to increase, which can clearly exhibit the effects of the bandwidth control based on the precedence owing to the setting of the intermediate throughput SCR in the present invention.

In this embodiment, a control cycle of a predetermined time is set, and the number CCR of cells transmitted according to connection is counted in the control cycle, while, whenever the control cycle starts newly, the number CCR of transmitted cells is cleared; thereafter, the counting of cells again starts. Thus, the number CCR of transmitted cells precisely indicates the number of cells transmitted in one control cycle (predetermined time), thereby enabling accurate bandwidth control.

Although it is also possible that this numbers CCR of transmitted cells on all the connections are simultaneously cleared at the time of the end of the control cycle, this clearing operation is time-consuming. For this reason, in this embodiment, the clearing operation is conducted through the use of the reset flag RF stored in a data section 13x of the aforesaid retrieval table 13a. That is, at the time that one-time control cycle comes to an end, the reset flag RF is set to "1" at all the addresses. In addition, in the next control cycle, whenever the cell transmission is conducted with respect to the hit connection in the retrieval, if the reset flag RF at the corresponding address indicates "1", the number CCR of transmitted cells is returned to zero and the counting again starts at 1 and the flag RF is returned to "0". In this way, in the initial stage of the control cycle, the number CCR of transmitted cells is cleared whenever the cell transmission takes place, which can eliminate the need for the simultaneous clearing operation.

Figure 6:
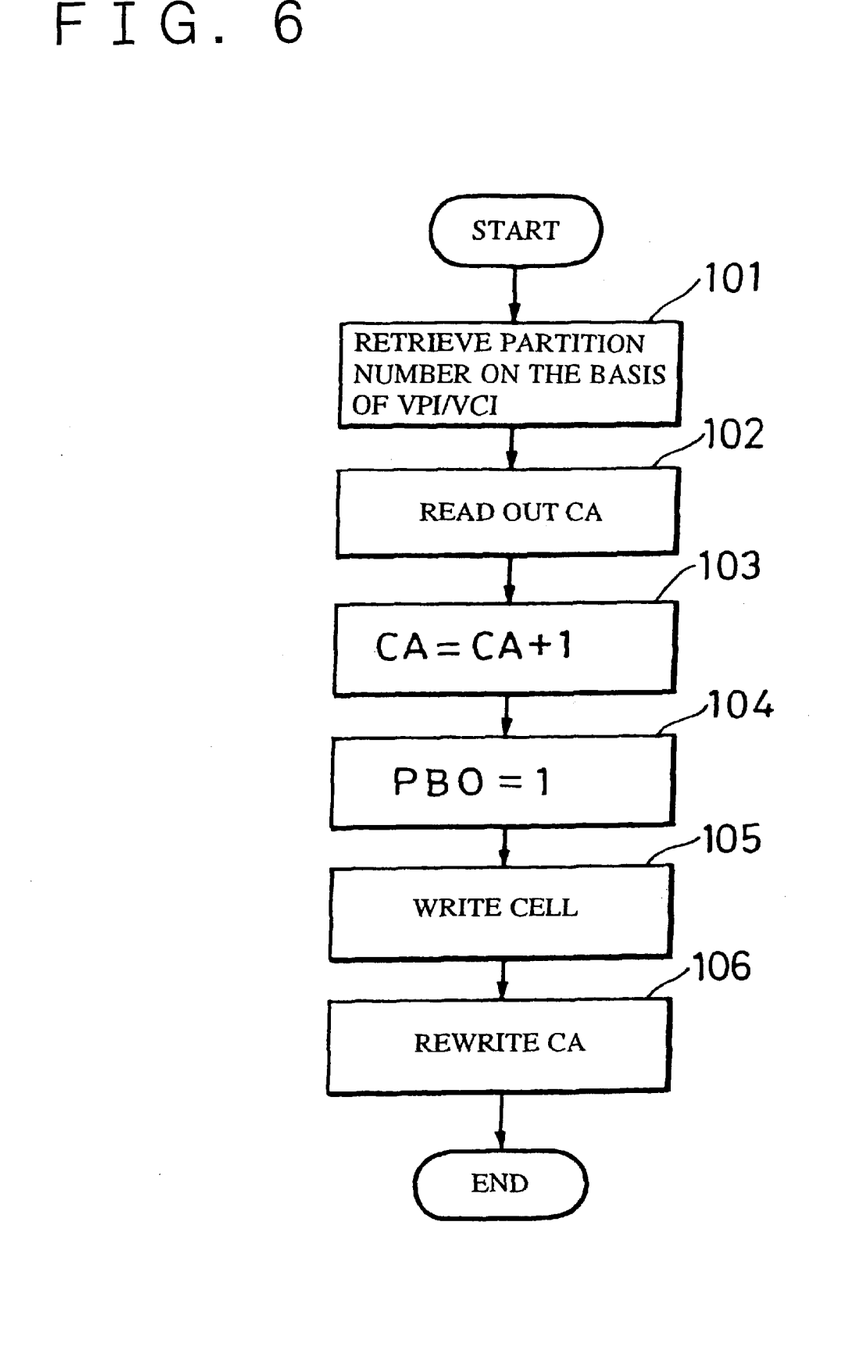
FIG. 6 is a flow chart showing a control operation at cell input.

For facilitating the understanding of the above-mentioned bandwidth control method, an operation in the ATM interface 10 will be described hereinbelow with reference to flow charts. FIG. 6 shows control at cell input.

In FIG. 6, when a cell is introduced from an ATM network through the photoelectric conversion circuit 20 into the ATM interface 10, the ATM interface 10 recognizes the identifiers VPI and VCI of that cell to refer to the reference table 14 for retrieving the corresponding partition number in the buffer 30 (step 101).

Following this, the ATM interface 10 reads out the number CA of accumulated cells in the retrieved partition from the memory 40 (step 102) and adds one thereto (step 103). In addition, the ATM interface 10 sets the accumulation status flag PB0 to "1" (step 104), writes the cell in the retrieved partition (step 105), and replaces (rewrite) the number CA of accumulated cells with this addition result in the memory 40 (step 106).

Figure 7:
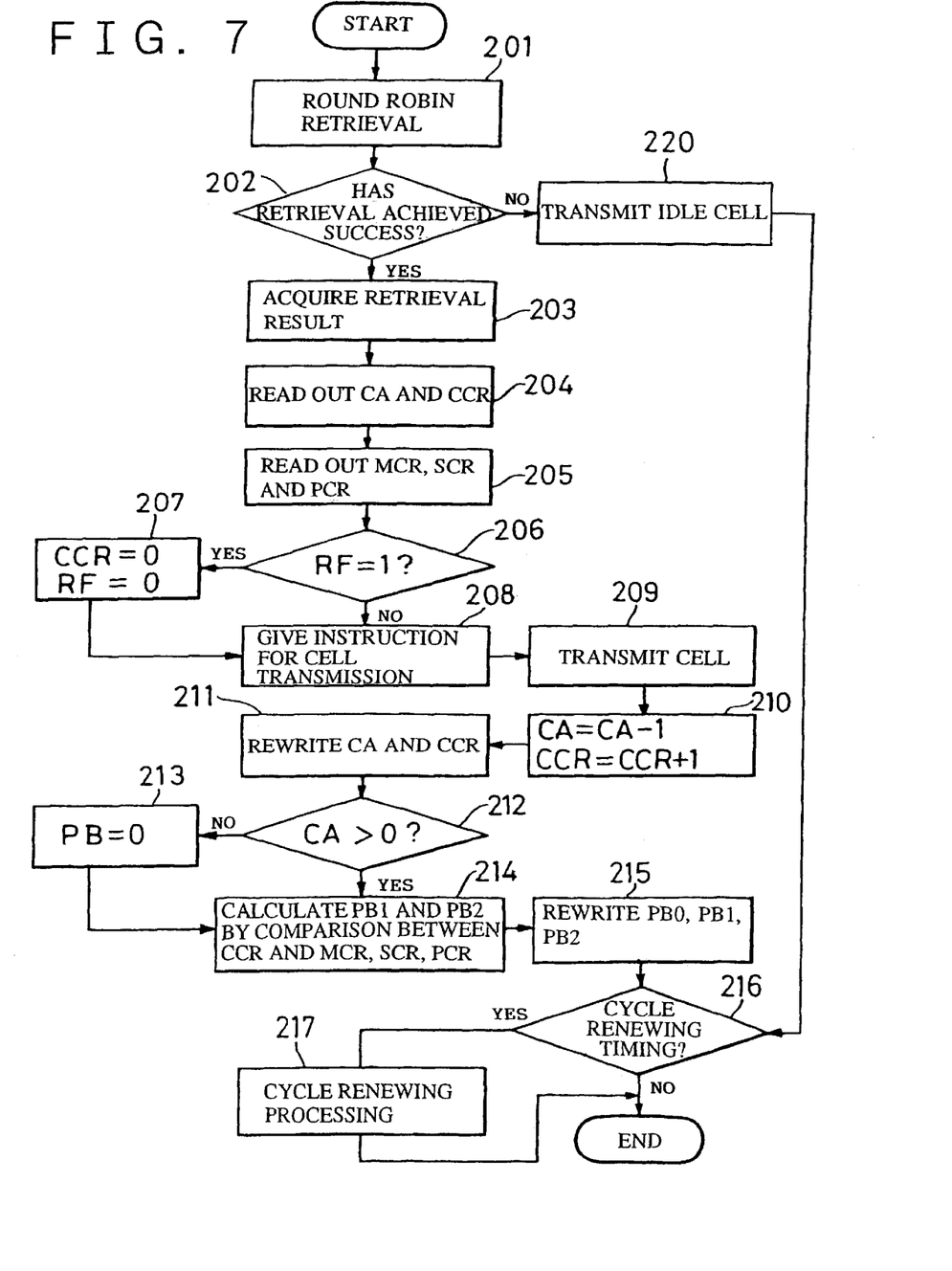
FIG. 7 is a flow chart showing a control operation at cell transmission.

FIG. 7 is a flow chart showing one-time cell transmission control. As mentioned above, this cell transmission is conducted in a cycle shorter by far than the control cycle for the bandwidth control.

The control begins with a step 201 to make a round robin retrieval, then followed by a step 202 to make a decision as to whether or not the retrieval has proven successful (whether or not a hit takes place). If a hit takes place, the retrieval result (the hit address information) is acquired in a step 203 to read out the number CA of accumulated cells and number CCR of transmitted cells for the corresponding connection from the memory 40 on the basis of the retrieval result in a step 204. In addition, the throughputs MCR, SCR and PCR are read out in a step 205.

Following this, the operational flow advances to a step 206 to decide whether or not the reset flag RF indicates "1". If the decision of the step 206 is affirmative, a step 207 follows to set the number CCR of transmitted cells at zero and to return the reset flag RF to "0". Furthermore, a step 208 is implemented to give an instruction for cell transmission, then followed by a step 209 to transmit the cell from the corresponding partition in response to the cell transmission instruction in the step 208.

After this, a step 210 is implemented to subtract (decrement) one from the number CA of accumulated cells and further to add (increment) one to the number CCR of transmitted cells. A step 211 follows to replace the number CA of accumulated cells and the number CCR of transmitted cells with the calculation results in the memory 40. Subsequently, a step 212 follows to make a decision as to whether or not the number CA of accumulated cells exceeds zero. For the negative decision, the operational flow goes to a step 213 to set the accumulation status flag PB0 at "0" and then to a step 214 to perform a class designation. On the other hand, for the affirmative decision, the operational flow directly proceeds to the step 214 without passing through the step 213. In the class designation of the step 214, as mentioned above, the two-bit data PB1 and PB2 representative of a class are calculated by the comparison between the number CCR of transmitted cells and the throughputs MCR, SCR and PCR.

Thereafter, the operational flow goes to a step 215 to rewrite PB0, PB1 and PB2 in the retrieval table 13, and further advances to a step 216 to make a decision on a renewing timing of the control cycle. For the affirmative decision, cycle renewing processing is conducted in a step 217. Concretely, for all the connections, the data PB1 and PB2 are reset to "0" while the reset flag RF is set at "1". On the other hand, for the negative decision, this routine comes to an end without implementing this step 217.

If the answer of the aforesaid step 202 shows no hit, an idle cell is transmitted in a step 220, and the operational flow jumps to the step 216.

In this embodiment, the software takes charge of only the setting processing of the throughputs MCR, SCR and PCR, the bandwidth control depends upon the hardware processing in the ATM interface 10 comprising an LSI, which enables prompt processing.

In addition, in this embodiment, various access modes can be taken by changing the lower-limit throughputs the intermediate throughput and the upper-limit throughput as needed. Examples will be described hereinbelow.

It is also appropriate that, for a portion of the connections, the lower-limit throughput is set at zero to remove the minimum bandwidth guarantee. If a portion of the connections accepts this processing, it is possible to offer the best-effort access service to a user concerned.

In addition, it is also appropriate that, for a portion of the connections, the lower-limit throughput MCR, the intermediate throughput SCR and the upper-limit throughput PCR are set to be equal to each other. In this case, the priority class becomes one in number to cause allocation of a pseudo fixed area, which can provide guarantee access for ensuring the minimum bandwidth.

Still additionally, it is also appropriate that, for a portion of the connections, the lower-limit throughput MCR is set at zero while, for another portion of the connections different therefrom, the lower-limit throughput MCR, the intermediate throughput SCR and the upper-limit throughput PCR are equalized with each other.

Moreover, it is also possible that, for all the connections, the lower-limit throughputs are equalized to each other, or the upper-limit throughputs are equalized to each other. In this case, the intermediate throughput is set according to the precedence regardless of the upper-limit and lower-limit throughputs.

Still moreover, it is also acceptable that, for a portion of or all of the connections, the upper-limit throughput is set at a considerably large value to substantially eliminate the maximum bandwidth restriction.

Furthermore, in this embodiment, although one intermediate throughput is set, it is also appropriate to set a plurality of (two or more) intermediate throughputs different from each other, which can accomplish the bandwidth control on the basis of finer precedence. In this case, preferably, the plurality of intermediate throughputs are set to partition equally the, range between the upper-limit throughput and the lower-limit throughput.

A detailed description will be given hereinbelow of a second embodiment of the present invention in which set are two intermediate throughputs SCR' and SCR". In this case, the two intermediate throughputs SCR' and SCR" are set to satisfy the following equations.

$$SCR'=MCR+(PCR-MCR)/3$$

$$SCR''=MCR+2(PCR-MCR)/3$$

In the second embodiment, each of the connections pertains to any one of four priority classes and one transmission inhibition class according to the number CCR of transmitted cells. That is:

when CCR<MCR, PR-1 (class having the highest transmission precedence);

when MCR≦CCR<SCR', PR-2 (class having the second-highest transmission precedence);

when SCR'≦CCR<SCR", PR-3 (class having the third-highest transmission precedence);

when SCR"≦CCR<PCR, PR-4 (class having the lowest transmission precedence); and when CCR=PCR, PR-0 (transmission inhibition class).

These five classes are expressed with three bits (PB1, PB2, PB3) as follows. That is:

for designation class PR-1, (PB3, PB2, PB1)=(0, 0, 0);
for designation class PR-2, (PB3, PB2, PB1)=(0, 0, 1);
for designation class PR-3, (PB3, PB2, PB1)=(0, 1, 0);
for designation class PR-4, (PB3, PB2, PB1)=(0, 1, 1); and
for designation class PR-0, (PB3, PB2, PB1)=(1, 1, 1).

In the case of the above-described first embodiment, as shown in FIG. 3, the retrieval is made a maximum of three rounds in conjunction with the transmission priority classes PR-1, PR-2 and PR-3. On the other hand, in the second embodiment, the retrieval is made a maximum of four rounds in conjunction with the transmission priority classes PR-1, PR-2, PR-3 and PR4.

Figure 8:
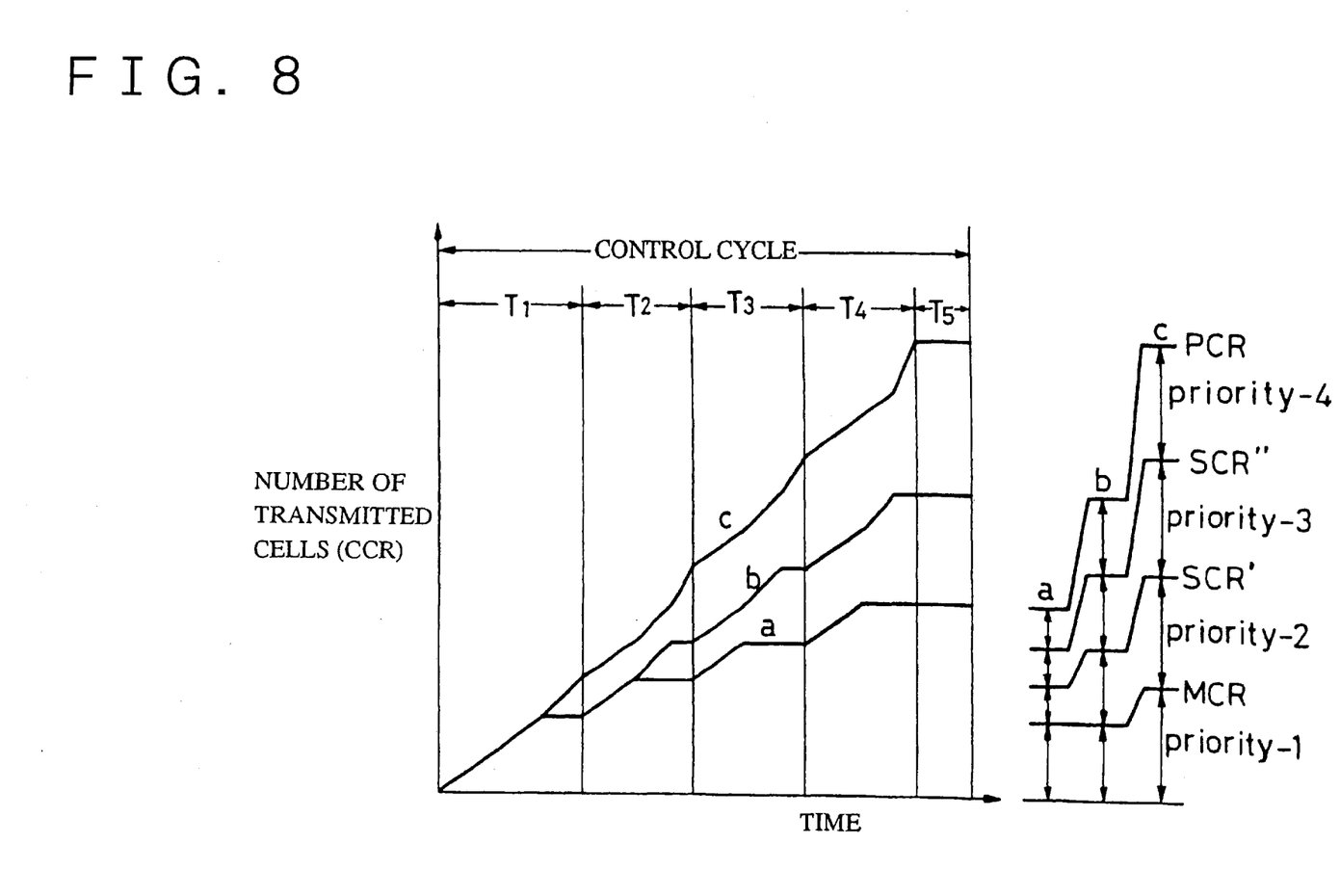
FIG. 8 is a graphic illustration showing a second embodiment of the invention, corresponding to FIG. 6.

FIG. 8 is an illustration of a state in which the number of transmitted cells increases according to connection with the passage of time during one-time control cycle, corresponding to FIG. 6 for describing the first embodiment. As obvious from this illustration, in the control cycle, the first time period T1 is a time taken until all the connections reach the lower-limit throughput MCR, the second time period T2 is a time taken until all the connections reach the intermediate throughput SCR', the third time period T3 is a time taken until all the connections reach the intermediate throughput SCR", the fourth time period T4 is a time taken until all the connections reach the upper-limit throughput PCR, and the last time period T5 is a time for which the cell transmission on each connection is in a stopping condition after all the connections reach the upper-limit throughput PCR. As obvious from the bandwidth control in the time periods T1, T2 and T3, the extra-bandwidth is finely allocatable according to the precedence.

The feature of this embodiment is the bandwidth control (extra-bandwidth control) in the intermediate time periods T2 and T3 of the control cycle. That is, the setting of the two intermediate throughputs SCR' and SCR" makes the precedence of the connections reflect the extra-bandwidth control finely.

It should be understood that the present invention is not limited to the above-described embodiments, and that it is intended to cover all modifications of the embodiments of the invention herein which do not constitute departures from the spirit and scope of the invention. For example, in the above-described embodiments, although the calculation of the number of transmitted cells is made by adding one whenever cell transmission takes place, the subtraction from the throughput is also possible as in the case of the above-described conventional art. In this case, the comparison between the number of transmitted cells and the throughput can be made simultaneously.

The bandwidth control according to the present invention is also applicable to the upstream communication control from a user to an ATM network. In addition, the present invention is also applicable to a communication system using a fixed-length packet, but is not limited to the ATM mode.

What is claimed is:

1. A communication control method of once storing fixed-length packets in corresponding storage sections in accordance with connection information contained in said packets and of then transmitting said packets from said storage sections in succession, said method comprising the steps of:

setting a lower-limit throughput corresponding to a minimum bandwidth to be ensured, an upper-limit throughput corresponding to a maximum bandwidth to be limited, and at least one intermediate throughput between said lower-limit throughput and said upper-limit throughput;

counting the number of packets transmitted for each of connections, and monitoring whether or not a packet to be transmitted exists in said storage section, for each of said connections;

retrieving a connection, satisfying a first condition that the number of transmitted packets does not reach said lower-limit throughput and said packet to be transmitted exists in the corresponding storage section, with first priority, and further, if no hit connection exists under said first condition, retrieving a connection satisfying a second connection that the number of transmitted packets does not reach said intermediate throughput and said packet to be transmitted exists in the corresponding storage section, and still further, if no hit connection exists under said second condition, retrieving a connection satisfying a third connection that the number of transmitted packets does not reach said upper-limit throughput and said packet to be transmitted exists in the corresponding storage section;

if a hit connection is present under any one of said first to third conditions, transmitting said packet from said storage section corresponding to the hit connection and terminating one-time retrieval, while if no hit connection exists under each of said first to third conditions, terminating one-time retrieval without conducting the packet transmission from said storage section and then resuming the retrieval at said connection satisfying that the number of transmitted packets does not reach said lower-limit throughput; and during the repetition of the retrieval, stopping the packet transmission for a connection where the number of transmitted packets reaches said upper-limit throughput.

2. A communication control method according to claim 1, wherein the connection retrieval is made in a predetermined sequence, and the following retrieval resumes at a connection subsequent to the hit connection.

3. A communication control method according to claim 1, wherein a control cycle of a predetermined time period is set so that the retrieval is made more-than-one times in said control cycle, and the number of packets transmitted is counted according to connection in said control cycle, and whenever said control cycle starts newly, the count value of packets transmitted is cleared, before the counting resumes.

4. A communication control method according to claim 1, wherein a plurality of intermediate throughputs are set as said intermediate throughput between said lower-limit throughput and said upper-limit throughput, and in the retrieval, a connection satisfying said first condition that the number of transmitted packets does not reach said lower-limit throughput and said packet to be transmitted exists in the corresponding storage section is retrieved with first priority, and if no hit connection exists under said first condition, the connection retrieval is made stepwise in the order of increasing intermediate throughput, and if no hit connection exists even in the retrieval made on the basis of the largest intermediate throughput, the connection retrieval is finally made for a connection satisfying said third connection that the number of transmitted packets does not reach said upper-limit throughput and said packet to be transmitted exists in the corresponding storage section.

5. A communication control method according to claim 1, wherein said intermediate throughput is set to partition equally the range between said lower-limit throughput and said upper-limit throughput.

6. A communication control method according to claim 1, wherein a portion of said connections is designed such that said lower-limit throughput is set at zero.

7. A communication control method according to claim 1, wherein a portion of said connections is designed such that said lower-limit throughput, said intermediate throughput and said upper-limit throughput are set to be equal to each other.

8. A communication control unit comprising:

a) a plurality of storage sections each for storing fixed-length packets for each of connections;

b) a storage control section for recognizing connection identification information contained in a packet inputted to store said packet in said storage section corresponding to the connection recognized;

c) a transmitted packet counting section for counting the number of transmitted packets for the corresponding connection whenever packet transmission takes place;

d) a control parameter memory for storing the number of transmitted packets counted in a control cycle of a predetermined time period, and further for storing the number of packets accumulated in said storage section according to connection;

e) an accumulated packet addition section for adding one to the number of accumulated packets in said control parameter memory to update the number of accumulated packets whenever a packet is stored in said storage section;

f) an accumulated packet subtraction section for subtracting one from the number of accumulated packets in said control parameter memory to update the number of accumulated packets whenever a packet is transmitted from said storage section;

g) a set parameter memory for storing a lower-limit throughput corresponding to a minimum bandwidth to be ensured, an upper-limit throughput corresponding to a maximum bandwidth to be limited, and at least one intermediate throughput between said lower-limit throughput and said upper-limit throughput, according to connection;

h) a class designation section for classifying all of said connections on the basis of throughput information stored in said set parameter memory according to connection and the number of transmitted packets stored in the control parameter memory according to connection so that a class in which the number of transmitted packets does not reach said lower-limit throughput is designated as a highest transmission priority class, and of a plurality of classes obtained by partitioning a range between said lower-limit throughput and said upper-limit throughput by said intermediate throughput, a class in which the number of transmitted packets is lower is designated as a higher transmission priority class, with said class designation section designating, as a transmission inhibition class, a connection in which the number of transmitted packets reaches said upper-limit throughput;

i) an accumulation status recognition section for recognizing a packet accumulation status signifying whether or not a packet is accumulated in said storage section, on the basis of the number of accumulated packets stored in said control parameter memory;

j) a retrieval table for storing the designated classes and a flag indicative of the recognized packet accumulation status for each of said connections;

k) retrieving means for conducting retrieval with respect to said retrieval table more-than-one times in said control cycle, with said retrieving means conducting the first retrieval in the order of descending transmission priority class and conducting connection retrieval on each of said classes in a predetermined sequence to seek a hit connection which pertains to a class under retrieval and for which said packet accumulation flag shows packet accumulation, and if no hit takes place on all said connections, conducting connection retrieval with respect to a lower transmission priority class and, if no hit takes place with respect to the lowest transmission priority class, outputting a retrieval result showing the absence of a hit connection while, if a hit on a connection takes place in any one of said classes, resuming the next retrieval at a connection subsequent to the hit connection; and l) a transmission control section for, when said retrieving means seeks a hit connection, transmitting said packets from said storage section corresponding to the hit connection, and for, when said retrieving means outputs the hit connection absence retrieval result, stopping packet transmission from said storage section.

* * * * *